May 2, 1967 | J. W. HORTON ETAL | 3,317,733

RADIATION SCANNER EMPLOYING RECTIFYING DEVICES AND PHOTOCONDUCTORS

Filed May 10, 1963 | 3 Sheets-Sheet 1

INVENTORS
JOHN W. HORTON
ROBERT J. LYNCH

BY Curtis Ailes Jr.
ATTORNEY

May 2, 1967

J. W. HORTON ETAL 3,317,733

RADIATION SCANNER EMPLOYING RECTIFYING DEVICES AND PHOTOCONDUCTORS

Filed May 10, 1963

3 Sheets-Sheet 3

United States Patent Office 3,317,733

Patented May 2, 1967

3,317,733

RADIATION SCANNER EMPLOYING RECTIFYING DEVICES AND PHOTOCONDUCTORS

John W. Horton, New York, and Robert J. Lynch, Peekskill, N.Y., assignors to International Business Machines Corporation, New York, N.Y., a corporation of New York Filed May 10, 1963, Ser. No. 279,531
20 Claims. (Cl. 250—211)

This invention relates to scanners of patterns of radiant energy and more particularly to electrical solid-state systems and devices which are capable of deriving electrical signal patterns from radiant signal patterns appearing along a line or in an area.

There are many presently known radiation scanners including optical image scanners such as cathode ray flying spot scanners, orthicon and vidicon tubes, and so forth. All of these commonly used scanning systems are generally quite complicated and expensive. They are often large and awkward in size, employing high voltages, and are delicate and easily subject to damage, and have limited useful lives.

Acordingly, it is one object of the present invention to provide radiation scanners which are simple, compact, and inexpensive.

It is another object of the present invention to provide radiation scanners which operate without the use of high voltages.

It is another object of the present invention to provide radiation scanners which are rugged and long lived.

Another object of the invention is to provide radiation scanners of the above description which are capable of high speed operation.

Other objects and advantages of this invention will be apparent from the following specification and the accompanying drawings which are as follows.

Figure 1:
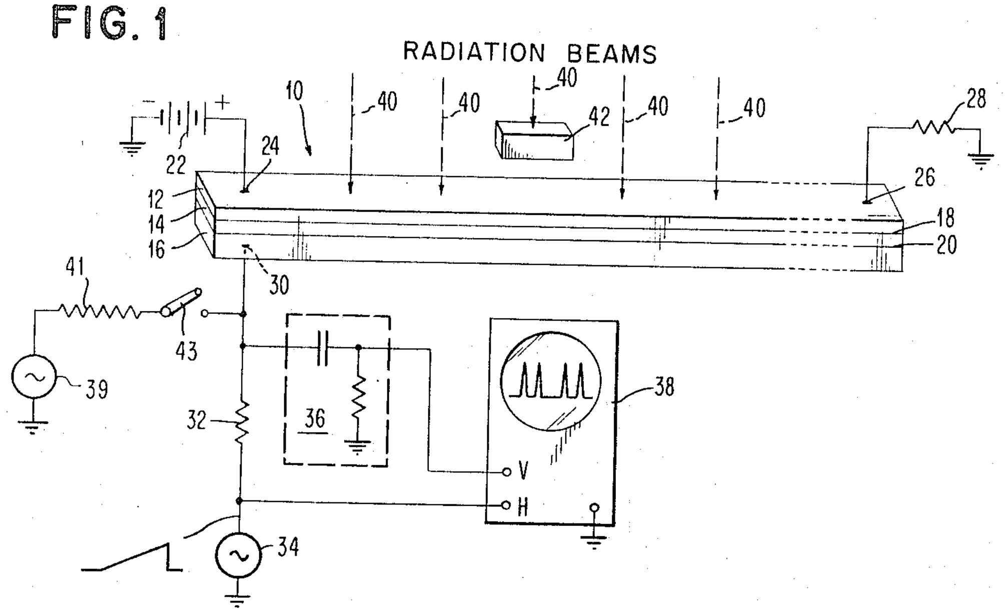
FIG. 1 is a schematic circuit diagram illustrating one embodiment of the present invention.
Figure 2:
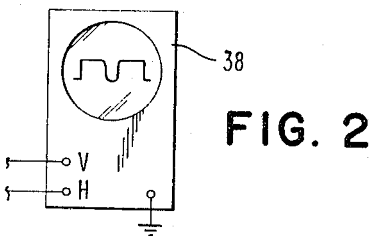
FIG. 2 is a schematic representation of a cathode ray oscilloscope showing a variation in electrical output available from the system of FIG. 1.
Figure 2A:
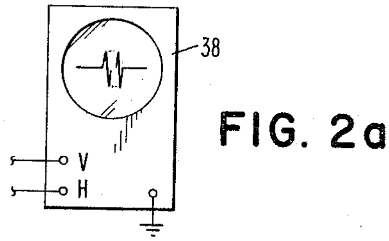

FIG. 2*a* is a view similar to FIG. 2 showing another variation in electrical output available from the system of FIG. 1.

Figure 3:
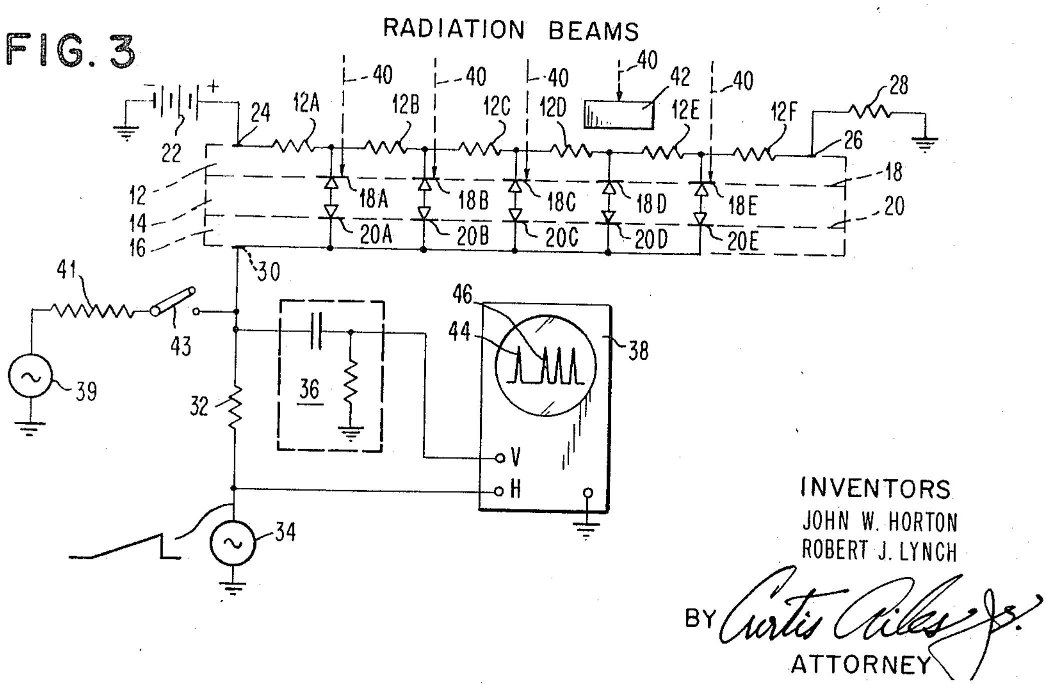

FIG. 3 is a schematic circuit diagram illustrating the principle of operation of the embodiment of FIG. 1.

Figure 4:
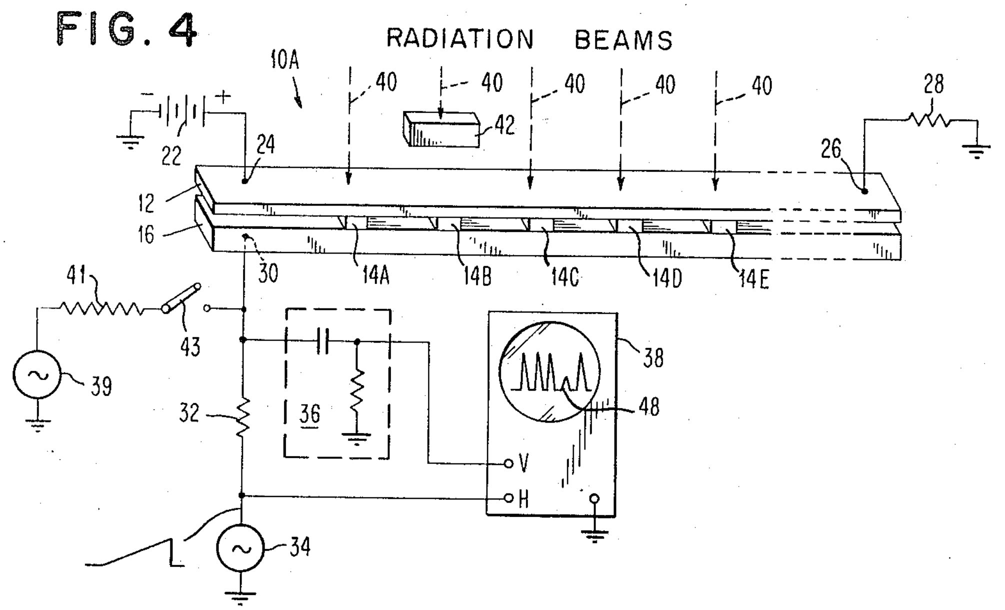

FIG. 4 is a schematic circuit diagram illustrating a modified embodiment of the invention.

Figure 5:
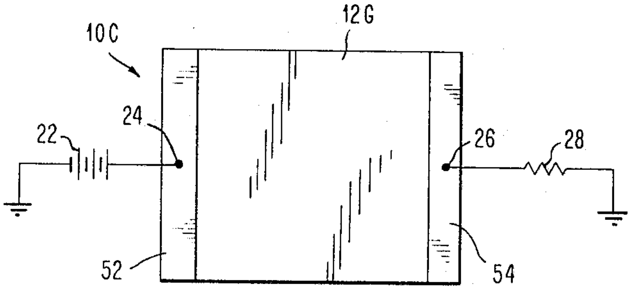
Figure 6:
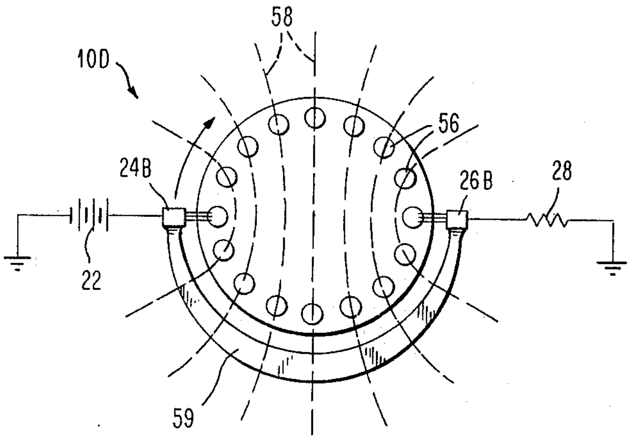
Figure 7:
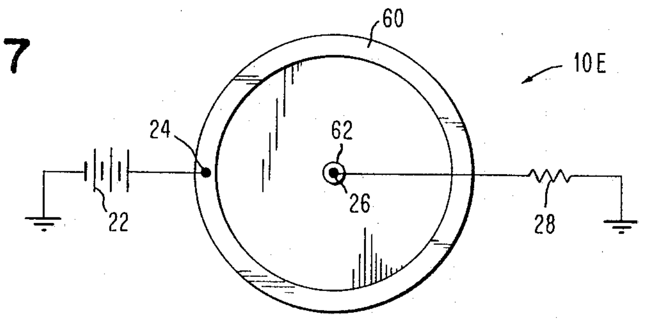

FIGS. 5, 6 and 7 are partial schematic views illustrating several modifications of the embodiment of FIG. 1 which are adapted for scanning areas.

Figure 8:
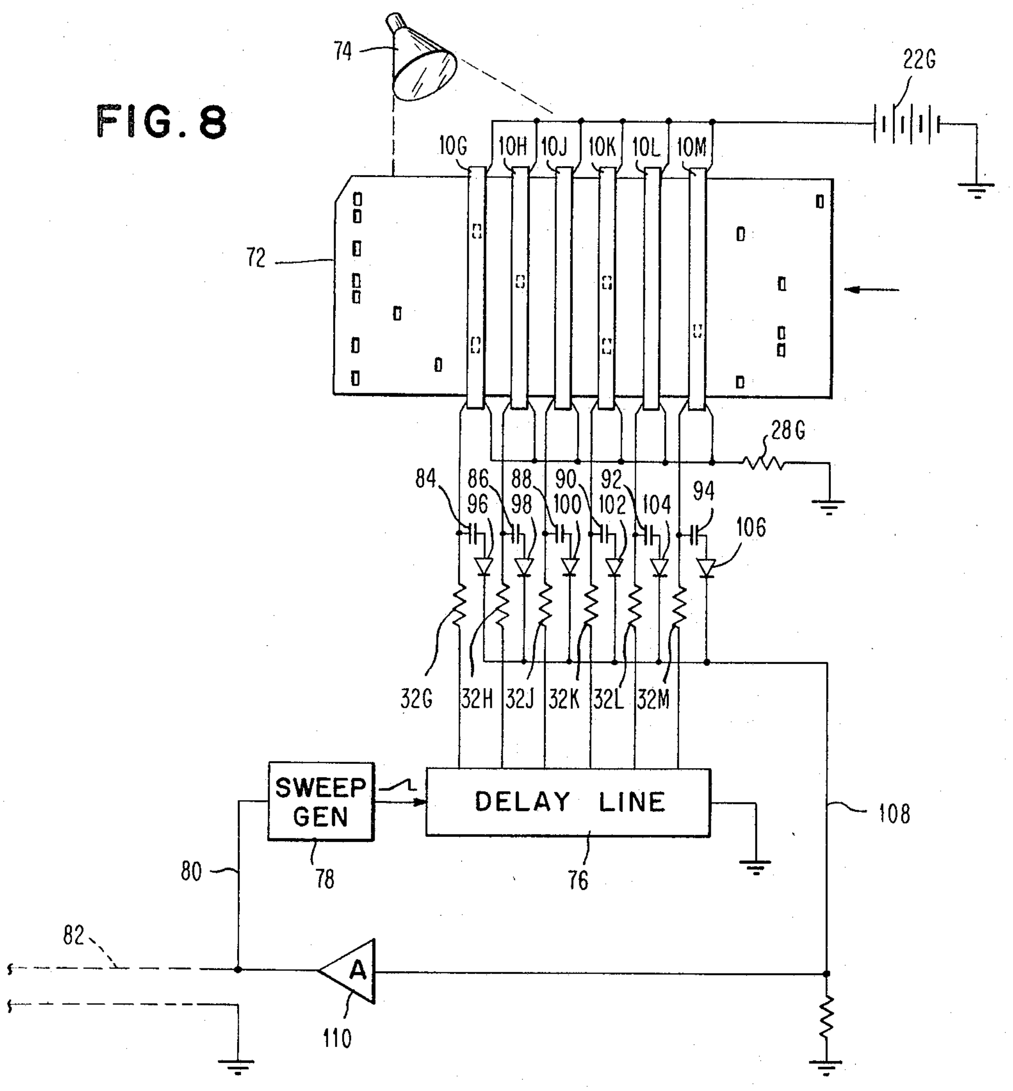

And FIG. 8 is a schematic diagram of another area scanning modification of the invention.

In carrying out the above objects of the invention in one preferred embodiment thereof, a radiation scanner is provided including an elongated multiple layer structure having an intermediate layer and two outer layers substantially defining the entire upper and lower surfaces of the elongated structure. The intermediate layer is joined to both outer layers throughout substantially the entire length thereof and the materials of the layers are selected to form an elongated asymmetrically conductive semi-conductor junction at each of the joints, the junctions having oppositely poled asymmetry. At least one of the junctions has conductive properties responsive to radiation received thereby, and at least one of the outer layers has electrical connections at laterally spaced positions thereon and arranged for connection to sources of different bias voltage levels. The other outer layer has at least one electrical connection arranged to be connected to a source of another bias voltage level. A source of a sweep voltage difference is applied between the outer layers, and a detector is connected in circuit between the outer layers for detecting functions of the current between the outer layers.

Referring more particularly to FIG. 1 there is shown an elongated multiple layer structure 10 including an upper layer 12, an intermediate layer 14 (which is also sometimes referred to as a central layer), and a lower layer 16. Upper and lower layers 12 and 16 are sometimes referred to hereinafter as outer layers as they define the upper and lower surfaces of the structure 10. The outer layers 12 and 16 are each joined to the central layer 14 at joints 18 and 20, and the materials of the layer are chosen so that joints 18 and 20 form oppositely poled asymmetrically conductive semi-conductor junctions or contacts. One of the junctions, such as 18, has conductive properties responsive to radiation such as photoconductivity. The upper layer 12 also serves as a resistive voltage divider, having a source of bias voltage schematically indicated by battery 22 connected to the upper layer as indicated schematically at 24, and having a connection, as schematically indicated at 26, through a resistor 28 to ground. The lower layer 16 is connected at 30 through a resistor 32 to a source 34 of ramp or sweep voltage. Transient changes in the voltages across resistor 32 corresponding to a frequency higher than the ramp voltage frequency are detected by means of a filter network 36 through which the transient voltage signals are supplied to a cathode ray oscilloscope 38. The upper surface of the structure 10 is exposed to a number of discrete beams of light, as indicated by the arrows 40, and one of the beams is obstructed by an opaque object, such as indicated at 42. As a result, a trace, such as indicated on the face of the cathode ray oscilloscope 38, is obtained which is indicative of the pattern of light striking the upper surface of structure 10. An auxiliary alternating current source indicated at 39 having a high impedance as schematically illustrated by resistor 41 is arranged for connection to point 30 by means of a switch 43. Source 39 provides an alternative mode of operation described in detail below in connection with FIG. 2*a*.

FIG. 2 is a partial view showing only the cathode ray oscilloscope 38, and illustrating the trace which is obtained with the system of FIG. 1 when the structure 10 is uniformly illuminated except for the obstruction 42. It is to be seen from FIG. 2 that the presence of the obstruction 42 is clearly indicated with uniform illumination. With the discrete beams of light as illustrated in FIG. 1, the cathode ray tube trace shows a positive blip for each unobstructed beam of light, with no blip being present for the obstructed beam. However, with continuous illumination, the trace pattern clearly shows the boundaries of the obstruction.

FIG. 3 schematically illustrates the principle of operation of the embodiment of FIG. 1. This figure corresponds to FIG. 1 except that schematic circuit components are illustrated for the structure 10 which indicate the electrical functions performed by the different portions of the structure 10. Thus, the fact that the upper layer 12 serves as a voltage divider resistance is schematically illustrated by the presence of the resistors 12A to 12F. Furthermore, the operation of the junctions 18 and 20 as oppositely poled asymmetrically conductive semi-conductor junctions is schematically illustrated by the diode circuit symbols at 18A through 18E and 20A through 20E. These devices, such as 18A and 20A, are connected back to back in individual pairs. Thus, for purposes of the present analysis, it may be considered that the semi-conductor junction 18 is divided into a series of discrete junctions 18A through 18E, and that the junction 20 is divided into a number of discrete junctions 20A through 20E. These discrete junctions are considered to occur at the locations where the discrete light beams 40 impinge upon the upper surface of structure 10. Since the junction 18 displays photoconductive properties, the light beams 40, or electron-hole pairs released in layer 12 by light beams 40, must reach the junction 18. Thus, the light beams 40 in FIG. 3 are shown as penetrating to the individual junctions 18A through 18E.

The operation of the circuit, as schematically illustrated in FIG. 3, may be explained as follows: Before the commencement of the sweep voltage from generator 34, the lower layer 16, which serves essentially as a conductive bus, is effectively connected through resistor 32 and generator 34 to ground. Thus, it may be said to be biased to zero. At the same time, the voltage from source 22 is divided through the voltage divider network provided by resistors 12A through 12F and 28 to provide a series of elevated voltage values at the diode junctions 18A through 18E. While these voltage values decrease from left to right in the diagram, even the lowest voltage value at diode 18E is a measurable positive voltage above ground because of the drop through resistors 12F and 28. For instance, at 18E the voltage may be approximately +3 volts. Thus, all of the upper diodes 18A through 18E are back biased, while all of the lower diodes 20A through 20E are forward biased. However, since the back biased diodes 18A, 18B, 18C and 18E are illuminated, and have photoconductive properties, they are conductive in the back biased condition. All of the resultant photocurrent through the diode pairs 18A, 20A and 18B, 20B, and 18C, 20C and 18E, 20E flow through to the lower layer 16, which acts as a conductive bus, and then through resistor 32 and generator 34 to ground. As the ramp voltage from generator 34 begins, the diode pair 18E, 20E is the first to achieve a null voltage condition in which the voltage of the lower layer 16 is raised to a level equal to the voltage of the upper layer in the vicinity of the diode 18E. The photocurrent through diode 18E is thus abruptly terminated and this abrupt change in current is detected across the load resistor 32 by the network 36, and the resultant signal is thus applied to the cathode ray oscilloscope causing an upward spike in the cathode ray oscilloscope trace as indicated at 44. As the ramp voltage continues, a null voltage condition is next achieved at the diode pair 18D, 20D, but since the light beam in the vicinity of this idode pair is interrupted by the opaque object 42, there is no appreciable change in current and no spike occurs at this point in the timing of the sweep. As the sweep voltage continues to raise the potential of layer 16, the diode pair 18C, 20C next achieves the null voltage condition and as a result another spike, as indicated at 46, occurs in the cathode ray oscilloscope trace. Similarly, as the diode pairs 18B, 20B and 18A, 20A successively achieve the null condition, the resultant current changes provide additional spikes in the cathode ray oscilloscope trace. Thus, it is to be seen that the cathode ray oscilloscope trace provides a visual indication which may be remote from the device 10, which shows which of the beams 40 has been interrupted by the opaque object 42.

After the diode pair 18E, 20E achieves the null condition, as the sweep voltage progresses, the voltage condition is reversed across this pair of diodes, thus, the voltage is in a direction to back bias the diode 20E and forward bias the diode 18E. However, substantially no current flow results from this condition because the diode 20E is not illuminated, and the diode 20E thus serves essentially as a blocking diode. Similar action is obtained from the other diodes at the junction 20. This blocking action is important to the operation of this invention because, in the absence of this blocking action, the currents through the diodes which had passed the null condition would load down the sweep generator 34 so that it would be very difficult to obtain an accurate calibrated sweep operation with a minimum of power dissipation.

As the above explanation implies, the central layer 14 is intended to have a very high lateral resistance, that is, the resistance of the central layer must be high in the horizontal direction in the diagram, while having a reasonable value in the vertical direction to provide an electrical connection between the members of each of the diode pairs. Thus, while this central layer is not an insulator, its lateral or transverse resistance is intended to be so high that its conductivity is ignored for the purpose of the analysis accompanying the schematic diagram of FIG. 3. The lower layer 16 is intended to be essentially conductive, so that it will be a unipotential electrode. This conductivity may be assured by providing a metallic plated conductor connected to the lower surface by low resistance, ohmic contact.

As indicated above, the schematic circuit representation of structure 10 is idealized for the purposes of explaining the principles of operation of the invention. It will be understood that since the outer layers 12 and 16 form continuous semi-conductor junctions with the central layer 14, they actually form the equivalent of an infinite number of diode pairs spaced horizontally along the structure 10, rather than only the five that are shown. However, since those which are not illustrated do not receive optical illumination, they may be ignored for the purpose of circuit analysis. This is true because one of the diodes in each non-illuminated pair is always back biased so that the pair is essentially non-conductive if a voltage difference appears across that pair. Thus, the diode pairs only achieve significance in the analysis of the operation of FIG. 1 when the upper diode is in a position to receive illumination.

However, it has been discovered that it is not necessary to employ discrete beams of light as illustrated in FIGS. 1 and 3. It is possible to employ non-discrete illumination at the upper surface of the structure 10 and to thus obtain the advantage of the essentially infinite number of diode pairs, and to obtain an output signal as illustrated for instance by the trace shown in FIG. 2. Thus, the central depression in the trace of FIG. 2 shows the exact position of the opaque obstruction 42. Therefore, the optical resolution of this scanner, with the continuous photoconductive semi-conductor junction 18 is extremely high.

FIG. 2*a* illustrates the system output available with an entirely different mode of operation which is obtained when the high impedance alternating current generator 39 is connected into the circuit by means of switch 43. This generator is preferably a radio frequency source, operating for instance at a frequency of about 200 kilocycles. This frequency is well above the threshold of the high pass filter network 36 so that the signal is readily available to the detection apparatus including oscilloscope 38. However, whenever an illuminated portion of structure 10 is being scanned, apparently there is effectively a low impedance path for the radio frequency from generator 39 through the illuminated diode pair and through the voltage divider formed by the upper layer 12 and thus to ground either through resistor 28 or through the D.C. bias source 22. Because of this low impedance connection, most of the radio frequency voltage appears across resistor 41 and very little appears across load resistor 32 to be detected by network 36 and oscilloscope 38. However, for those locations where illumination is shielded from the scanner, such as by obstruction 42, the low impedance condition does not exist, and thus a strong signal is available from generator 39 to the oscilloscope 38. Whether or not this theory that the operation of the system with radio frequency generator 39 is correct, it has been discovered that excellent, high amplitude output signals are obtained which are essentially the inverse of the output signals obtained when the system is operated in the manner described previously. That is, a large output signal amplitude is available on the oscilloscope for darkened portions of the scanner structure 10, and by contrast virtually no output is obtained for the illuminated portions. Actually, the radio frequency output signal illustrated in FIG. 2*a* results from the super-position of the radio frequency signal upon the signal which is essentially a direct current signal as illustrated by the trace shown in FIG. 2. However, the radio frequency output amplitude is so much greater than the D.C. signal amplitude that the amplifier of the oscilloscope 38 is turned down so that the D.C. component of the output signal is reduced almost to the vanishing point. Thus, the trace shown in FIG. 2*a* essentially indicates only the presence of the radio frequency component. This may be regarded as a modulated radio frequency output signal which could be immediately useful for carrier-current or radio transmission.

The structure of 10 may be successfully produced by many of the known semi-conductor processes and from many of the known materials which are capable of providing semi-conductor junctions. Since high resistances are desired in the upper layer 12 and the central layer 14, silicon is a particularly desirable material because of its high resistivity. In one instance, a successful structure was formed of NPN silicon material having an upper N layer about 0.00025 inch thick and having a resistivity of about ten ohm centimeters, a central P layer 0.0005 inch thick and having a resistivity of about twenty ohm centimeters, and a bottom N layer of 0.006 inch thick and a resistivity of ten ohm centimeters. In this structure the upper two layers were epitaxially grown onto the lower N layer. In another embodiment, each of the three layers had a thickness of approximately 0.0015 inch. In this case, the structure was produced by diffusion of phosphorous into the outer surfaces of a P type silicon structure to the required depth to provide N regions and the resultant PN junctions. The diffusion may be accomplished by conventional diffusion techniques. With the last-mentioned structure, having an upper layer thickness of 0.0015 inch, incident radiation having a wavelength of 8900 angstroms and higher penetrates the upper silicon layer to the upper junction quite efficiently.

Almost any of the known semi-conductor materials may be employed in the present invention, including the compound semi conductors such as gallium arsenide and cadmium diarsenide, as well as the monatomic semi-conductors such as germanium and silicon, and most of the known production methods may be employed for obtaining the desired junctions. However, at the present stage of development of semi-conductor technology, for the structure of FIG. 1 silicon appears to be the best because of its production controllable high resistivity and because of the apparent prospect of producing much higher resistivity.

Among the known processes other than diffusion for producing semi-conductor structures required in the present invention there are the alloying methods. For instance, a semi-conductor such as germanium may have an alloyed layer of metal such as indium applied to the top and the bottom to form fusion junctions with the germanium. This will form a PNP structure. The metal layers may also be formed by electrolytic deposition—having the advantage of low temperature formation to preserve the high resistivity of the semi-conductive central layer. The metallic upper layer must be thin enough to provide the desired resistance for the voltage divider and to admit the radiation to the junction. While the above descriptions relating to FIGS. 1, 2 and 3 were in terms of the use of an NPN structure, it will be apparent that by reversing the polarities of the operating voltages, a PNP structure may be employed with equal facility. It is also clear that various other heterojunction structures employing different materials in the different layers, which may be of the same conductivity type, but which nevertheless have the ability to form asymmetrical junctions, are useful in this invention.

An interesting combination of materials exists where the outer layer which is exposed to radiation can be chosen so that it is substantially transparent to the radiation and the central layer is opaque. In this instance, the operation of the device is very efficient because the radiation is all substantially absorbed in the junction. An example of this class of structures is one employing gallium arsenide as the outer layer and germanium as the material of the central layer. This is an example of a heterojunction since both materials are of N conductivity type, but they nevertheless form a radiation sensitive asymmetrically conductive semi-conductor junction.

The different layers 12, 14 and 16 may be referred to in this specification as being comprised of different materials. It will be understood that differences between the materials of these different layers is only that difference which is required for the purpose of producing an asymmetrically conductive semi-conductor junction. Thus, the layers may differ only in conductivity type such as P and N type silicon, or both may be of the same conductivity type but composed of different molecules such that asymmetrically conductive junctions are produced. Greater differences may also exist. For instance, the different layers may be of different semi-conductors of different conductivity types, or a semi-conductor plus a junction-forming metal. Thus, the term "semi-conductor junction," as used in this specification, refers to a joint or contact between different materials, as least one of which is a semi-conductor. It is not necessarily a junction between semi-conductors, or between different conductivity type semi-conductors. This broad category is sometimes referred to as "contacts" rather than "junctions."

The upper layer which is exposed to radiation is preferably thin enough so that the radiation is capable of producing "hole-electron" pairs at the upper junction. This may occur even without penetration of the radiation to the junction, as long as the hole electron pairs are created in the upper layer in the near vicinity of the junction. The radiation may also be applied to the edge of the structure to reach the junction directly without traversing the upper layer.

One of the most interesting aspects of this invention is that it is basically a low voltage device. For instance, with the structure of FIG. 1 satisfactory operation is achievable with a voltage gradient across the upper layer of no more than five to ten volts per inch. This presents many advantages including safety, and the possibility of light weight and inexpensive power supplies. Also operation from remote power and control signal sources is much more feasible.

FIG. 4 shows a modification of the embodiment of FIG. 1 in which the intermediate layer 14 of the structure 10A is discontinuous, being composed of individual bridges of material indicated at 14A to 14E between the upper layer 12 and the lower layer 16. The remainder of the space between the outer layers is simply open. However, it may be filled with insulating material if desired. This modified structure has the virtue that the lateral resistivity of the central layer between individual bridges such as 14A and 14B is infinite. However, there is no longer an infinite number of diode pairs and the resolution of the device is dependent upon the spacing of the discrete material bridge "dots." Despite this, high resolutions are attainable, as will be explained below.

The operation of the FIG. 4 embodiment of the invention is directly analogous to the operation of the system of FIG. 1 with discrete beams of radiation as explained in connection with FIG. 3. The embodiment of FIG. 4 is incapable of providing a trace such as that shown in FIG. 2 because the discrete "dots" of central layer material necessarily cause a trace of discontinuous "blips" as shown, even with uniform radiation. However, it should be pointed out that the illustration of FIG. 4 is a simplified and idealized representation of the embodiment having discrete operable portions caused by the discontinuous central layer. It is intended that such a structure shall include a large number of very closely spaced central layer material bridges and that the structure shall be proportionately longer than shown. It should be mentioned in this connection that the embodiment of FIG. 1 also is intended to be proportionately longer than shown. In addition to the advantage of infinite impedance in the discontinuities of the central layer, the embodiment of FIG. 4 also provides the advantage that whenever one of the discrete junctions is masked from illumination, it nevertheless causes a "dark current pip" in the output signal as the null voltage condition is achieved. This "pip" provides an indexing signal which serves to precisely determine the state of the sweep operation of the system. Such a pip is illustrated in FIG. 4 at 48.

A successful structure in accordance with FIG. 4 has been produced by employing elongated bars of germanium for the outer layers 12 and 16, and by fusing drops of indium metal between the two pairs in a furnace in order to produce the intermittently spaced material bridges 14A–14E. For this structure, the germanium bars may be about 0.006 inch thick and about 0.010 inch in width, and the "dots" of indium may be approximately 0.005 inch in width. The "dots" may be spaced from 0.035 inch down to 0.010 inch on centers. With this sort of a structure it has been found to be possible to accomplish the scanning function with as little as one quarter of a volt difference in voltage bias between adjacent indium material bridges or "dots." Devices of this type are capable of withstanding maximum voltages in the range from 50 to 200 volts without encountering breakdown. Accordingly, it is possible to provide a structure in accordance with FIG. 4, and with the above materials, having from 200 to 800 indium dots as a maimum. It is obvious from this that with the discontinuous central layer, the scanners of the present invention are capable of extremely high resolution. Apparently, the lateral conductivity of the central layer in the continuous layer version of the invention illustrated FIG. 1 limits the resolution of that device in some respects. Accordingly, this discontinuous central layer embodiment of FIG. 4, when composed of many closely spaced "dots," may provide even higher resolution than certain of the continuous central layer versions of the invention.

As illustrated thus far, the scanners of the present invention are essentially capable of scanning only a line, and not an area. However, it will be apparent that the line scanners may be employed to scan areas by providing for relative movement between the scanner and the area pattern to be scanned. Thus, the line scanner will provide information about the entire area by looking at the area as a succession of lines which are scanned in sequence. It is possible also to provide a line scanner structure which is capable of scanning an area by building the structure in a zig-zag pattern so that it scans back and forth over the whole area without the necessity for relative movement between the scanner and the pattern to be scanned. Various other line scanning patterns or shapes may be employed either to scan an entire area, or to simply scan a particular portion of an area. It is also possible to provide a number of line scanners physically arranged in parallel alignment so that each will scan a different portion of the pattern to be scanned. These parallel arranged line scanners can operate simultaneously or in sequence and they may be operated in response to a common control system. Such an arrangement is shown in FIG. 8 and described in more detail below.

FIG. 5 illustrates a partial schematic top view of an area scanning structure which is basically simply a wide version of the structure of FIG. 1. In order to assure that the current is distributed evenly across the upper layer 12G in the structure 10C of FIG. 5, the connections 24 and 26 to the bias voltage source are supplemented by plated electrodes 52 and 54 at the ends of the structure. In essence, therefore, this is an expanded or widened line scanner which is capable of scanning areas. While this area scanner will not provide precise reproduction of a picture, for instance, it will provide sufficiently distinctive scanning signals for purposes such as character recognition so that certain letters or characters can be distinguished from certain others. Rather than scanning from point to point along a single line, as the line scanner does, the area scanner accomplishes the scanning function from line to line across the area between electrodes 52 and 54, these lines being parallel to electrodes 52 and 54. This scanning action may be likened to the movement of a mechanical slit aperture across the area, but in the present invention, this action is obtained entirely by electrical means so that it is very accurate and precise and does not involve any of the problems of acceleration and deceleration of parts such as is encountered with mechanical devices. Thus, the scanner provides precise information on the illumination at each line of the scan. For purposes of clarity, in FIG. 5, the sweep generator 34, the load resistor 32, and the associated apparatus have been omitted. However, it will be understood that these components are to be employed with the embodiment of FIG. 5 and are to be essentially the same as shown in FIG. 1.

FIG. 6 shows another area scanner modification in which the contacts 24 and 26 have been replaced by commutator brushes 24B and 26B. These brushes are arranged to make contact with plated electrode spots 56 on the upper surface of the modified structure 10D. The operation of the system again is similar to that of FIG. 5 except that the patterns of equal potential conditions existing across the upper layer of the structure 10D are as indicated by the dotted equal potential lines 58. This gives still a different scanning pattern which is particularly useful in detecting the presence of certain characters or shapes such as in character recognition. Preferably, the brushes 24B and 26B are mounted and supported on a rotatable yoke 59 so they can be rotated together to provide for scanning operation along different diagonal directions on the structure 10D. These variations in direction are also very useful in making successive scans for accomplishing the character recognition function.

Alternatively, electronic switching may be employed to switch the bias voltage to different opposed pairs of conductive spots 56 in the structure of 10D so as to establish different diagonal directions of scan. Also, the pattern of equal potentials across the structure 10D may be modified by applying bias voltages to several pairs of spots simultaneously and by suitably adjusting these voltages in order to obtain output signals indicative of different patterns of scan.

FIG. 7 is a schematic representation of another modification of the invention which is capable of providing a circular scan in which the bias potential is applied between an outer ring electrode 60 and a central electrode 62 on the structure 10E. The resultant circular pattern scan is particularly valuable for identifying closed characters such as the letter "D," the letter "B," or the digit "0." It will be apparent from FIGS. 6 and 7 that there is an almost infinite variety of special purpose scanning structures which may be built up from modifications or combinations of the structures shown. For instance, a double circular scan structure can be provided for the special purpose of identifying characters having upper and lower closed portions, such as the letter "B," and the figure "8." Such a structure is also useful for detecting the presence of a single closed portion in the upper character region, such as occurs in the capital letter "A" or the capital letter "R," or in the lower character region such as in a lower case letter "b" or in number the "6."

In FIGS. 6 and 7, as in FIG. 5, the sweep generator 34 and the load resistor 32 and the associated apparatus have again been omitted, but are understood to be present in the actual embodiments.

FIG. 8 shows an area scanning system in accordance with the present invention and employing a plurality of line scanners indicated at 10G through 10M. These scanning structures are physically arranged in parallel alignment for the purpose of individually scanning different columns of a punched card 72, the opposite surface of which is illuminated by a light source indicated at 74. The structures 10G through 10M are supplied from a common bias supply source schematically illustrated at 22G and the other end of the common bias circuit includes the resistor 28G and the associated connection to ground. The sweep voltages to the structures 10G through 10M are provided through the respective load resistors 32G through 32M from a delay line 76. The sweep voltages are obtained from a conventional sweep voltage generator 78 in response to a trigger pulse applied to the sweep generator at 80 from a remote control line 82. When it is desired that the information be obtained from the system of FIG. 8, a trigger pulse is sent from the remote control station through the connection 82 to trigger the sweep generator 78. The sweep pulse travels down the delay line 76 and sequentially causes the sweep operation at each of the scanning structures 10G through 10M. The resultant output signals are then supplied through the capacitors indicated at 84 through 94, and the blocking diodes indicated at 96 through 106 to a common output line 108. From the output line 108, these signals are applied to an amplifier 110 which in turn provides amplified output signals to the signal line 82 so that the information is transmitted back to the central control station. This system is very simple and inexpensive since it requires only a single pair communication line for the purpose of communicating between the remote central control station and the scanning apparatus, and since a very minimum of equipment and power supply is required at the scanning location.

It will be obvious that other modifications of the system of FIG. 8 are possible. For instance, it may be desirable in some instances to provide a separate sweep generator for each of the scanner structures 10G through 10M. It may also be desirable in some instances to employ a commutator device different from the delay line 76.

While only six of the scanner structures 10G through 10M are shown in FIG. 8 for scanning six columns, it will be understood that the system may be easily extended to any desired size, such as including apparatus sufficient to scan the entire eighty columns of a conventional punched data card. It will be understood also that the system of FIG. 8 is very useful for optical scanning of almost any rear radiation source, the punched card being shown in FIG. 8 only for purposes of illustration.

The radiation sensitive structure 10 of FIG. 1 may be constructed so that it is symmetrical about the intermediate layer 14. It will be obvious then that the lower juncion 20 formed between the intermediate layer 14 and the lower layer 16 may be constructed so that it is photosensitive, or sensitive to non-visible radiation. Thus, either the upper junction 18 or the lower junction 20 may be radiation sensitive, or both of these junctions may be radiation sensitive and both may be arranged to receive radiation signals.

Referring back to FIG. 3 and recalling the explanation of operation accompanying FIG. 3, it will be clear that if the lower junctions 20A through 20E are illuminated instead of the upper junctions 18A through 18E, then the sweep voltage from generator 34 will actually cause the diode pair 18E, 20E to turn on rather than turning off after the null voltage condition and reversal of bias is achieved. There will then follow in succession the turning on of the succeeding illuminated diode pairs. The current change signals detected by the network 36 and the oscilloscope 38 will be essentially the same as they are for illumination of the upper junctions. (A similar result is achieved if the sweep voltage is reversed so that diode pairs are turned on rather than off when the upper layer is illuminated.)

If both junctions are illuminated, then a double amplitude signal is provided to the oscilloscope 38. Accordingly, in a system where discrete radiation beams such as beams 40 of FIG. 1 are used or in the discrete diode version of FIG. 4 in which the intermediate layer is discontinuous, by illumination of both sides of the radiation responsive structure 10, a comparison of the information on the upper and lower sides is possible. Thus, where beams on the upper and lower surfaces coincide, a double amplitude signal results, but where coincidence does not occur there is only a single amplitude signal, or no signal if both sides are dark. By employing an output detector which is responsive only to output signals above the single amplitude, only the coincidence signals appear at the output. Such a modification of the system of the present invention has obvious advantages and utility. For instance, conventional punched data cards can be optically compared very rapidly. It may also be observed that if the structure 10 is illuminated on its side edge so that the radiation reaches the junction without having to transverse the upper layer, it is not necessary to mask the junction 20 so that only junction 18 is illuminated. This is true because, as pointed out above, illumination of both junctions will simply enhance the output.

Another interesting feature of the invention is that the current resulting from incident radiation upon each back biased semi-conductor diode portion of the structure is substantially independent of the back bias voltage and is almost entirely dependent upon the intensity of the radiation to which the diode is exposed. This assumes, of course, that the back bias voltage is above the minimum value which is required to initiate conduction. This is an important feature, particularly when the structure 10 is subjected to radiation on both outer layers. This feature is important because it means that changes in current detected at load resistor 32 during scanning are due almost exclusively to the shut-off or turn-on of individual diode pairs as the null voltage condition is passed during the sweep.

One of the important features of the present invention resides in the fact that very little power drain is required from the sweep generator and to the output detector. Accordingly, it is quite practical to locate the sweep generator and the detector portions of the system remote from the radiation responsive structure 10 so that it is possible to use the scanner system for remote scanning. With such a physical separation between the location of scan and the location of signal utilization, the system has many uses. One important class of such uses is in the gathering of physical data for process control systems. For instance, the line scanner version can be used to detect the position of the pointer of a meter, or the elevation of a mercury column in a thermometer. Furthermore, if the modification of FIG. 4 is employed for these purposes, then the discrete signals available from the individual diode pairs provide signals which may be regarded as digitized signals. The apparatus then is effective not only to provide a remote electrical indication of the data, but to provide such an indication in digitized form. As prevously mentioned, the digitization can also be accomplished by employing discrete light beams as shown initially for FIG. 1. The light from a single source may be divided into discrete beams for this purpose by means of a perforated mask.

It will be observed that the total bias voltage from source 22 in the embodiment of FIG. 1 should be approximately equal to the maximum amplitude of the sweep voltage available from generator 34 in order to assure that the entire device 10 is scanned. It is an interesting feature of this invention that these voltages need not have precisely determined values as long as there is a reasonable degree of correlation between the two voltages, an as long as the voltages are sufficient to provide operation of all of the diode pairs within the device 10. Since these voltages may be allowed to vary rather widely, as long as they are correlated in amplitude, it is sometimes advantageous to supply both voltages from a single source. Thus, the bias voltage available from source 22 in FIG. 1 may be provided instead from a square pulse wave generator, and the same square pulse wave may be supplied also to a suitable network to provide a sweep voltage for use in place of the sweep voltage source 34. This suggests the further possibility that the source of the square wave voltage may be quite remote from the scanning structure 10 and the operation of the device will obviously be satisfactory despite variations in transmission losses of the square wave signal which serves to provide both the bias voltage and the sweep voltage.

Another important feature of the present invention is that the scanning apparatus is responsive to a rather wide range of radiation intensity. This may be described also as "gray scale" sensitivity. The gray scale terminology is employed because it signifies an ability to distinguish not only between black and white, but also an ability to distinguish grays. It has been discovered, for instance, that with one physical embodiment, it is possible to detect various gradations of light intensity generally in the range from somewhat less than 100 footcandles to more than 1,000 footcandles with an incandescent tungsten filament as the light source.

In all of the embodiments of the invention, the output detection system has been indicated as consisting of the load resistor 32, network 36, and a cathode ray oscilloscope 38. The cathode ray oscilloscope 38 may be of any conventional commercially available type and therefore it is not shown in detail here. Typically, the load resistor 32 may be in the range from 50 to 100 ohms, the capacitor of network 36 may have a capacity in the order of 0.0015 microfarad, and the resistor in network 36 may have a value in the order of 1,000 ohms. While the final output device of the detection apparatus is shown as a cathode ray oscilloscope, in each of the embodiments, it will be understood that other more elaborate detection apparatus may be employed to receive the output from the scanner system. For instance, the series of pulses, or the current change signals may be supplied directly to the input of a computer to accomplish various logical results in response to the scan signal. Also, the scanner, or a combination of scanners may be arranged to scan an area, and the output signals may be supplied to an electronic picture reproduction system including a conventional television picture tube so that an exact visual reproduction of the area which is scanned may be produced. Thus, the invention may be used as a television camera.

All of the above explanations of the operation of this invention have emphasized the detection of transient signals such as are available through the network 36. However, it should be emphasized that useful information may be obtained from the system of the present invention by detecting other characteristics of the voltage appearing across the resistor 32 resulting from the current therein. Thus, the total current at any particular time is a measure of the illuminations striking that portion of the scanning structure containing diode pairs which are not biased off. It is also apparent that the transient signals may be detected by means other than resistor 32 and network 36. For instance, a transformer may be employed to inductively couple the output detector such as oscilloscope 38 to the load circuit including contact 30. The transformer primary winding may take the place of resistor 32.

An interesting feature of the present invention resides in the discovery that greatly improved resolution is available from the apparatus when the scanning structure 10 achieves an elevated temperature in the order of 100° C. This result has been observed particularly with silicon scanning structures. It is believed that the elevated temperature somehow enhances the hole-electron pair activity resulting from the incident radiation. Accordingly, the heat which is generated within the structure 10 by reason of the bias voltage across the outer layer 12 and the resulting current therein, does not create any problems. On the contrary, the heat is advantageous and the design of the structure 10 is preferably made to adjust the heat dissipation capabilities to provide a steady state operating temperature in the order of 100° C.

The operation of the scanners in accordance with the present invention is enhanced by the application of conventional lens coating materials such as silicon monoxide. This coating should preferably be in the order of one-quarter of a wave length of the light with which the scanner is to be employed.

Another interesting aspect of the present invention is that it is responsive to a wide spectrum of radiation. For instance, it is very responsive to radiation in the infra-red range. This is a very interesting feature of the invention because infra-red detectors which are commercially available at present, generally require rather high operating voltages. Since the present invention is a low voltage device, it provides the possibility for a portable and safe and inexpensive infra-red detector.

Another interesting feature of the present invention is that it is operable over a wide sweep speed range. There is virtually no lower limit in the sweep speed and in the upper end of the speed range sweep speeds of at least one tenth of an inch per microsecond are attainable. This corresponds to a read-out rate of one million spots per second. Thus, the apparatus is extremely fast in operation where speed is required, but is capable of operation at almost any speed without impairment in accuracy.

As indicated, above almost any of the combinations of materials which are useful in the production of semi-conductor junctions or contacts which are asymmetrically conductive, are also useful in the present invention. Furthermore, most of the various methods for producing semi-conductor junctions are also useful in the production of the structures 10 of the present invention. Many of these structures and methods, and many other applicable teachings with respect to semi-conductors are to be found in the Handbook of Semiconductor Electronics, by Lloyd P. Hunter, Second Edition, published by McGraw-Hill Book Company in 1962.

In the embodiments employing a semi-conductor for the top layer 12, the semi-conductor material of the top layer is often photoconductive. This means that the reduction in the resistance of illuminated portions of the top layer are reduced in resistance so as to modify the operation of the top layer as a voltage divider. The result is a distortion of the scan because the scan will proceed more rapidly across the illuminated areas and more slowly across the dark areas. This distorts the trace which is produced such that the dark areas appear wider and the illuminated areas appear narrower, and at the same time have an enhanced signal amplitude. The enhancement of the signal is caused by the increased speed of sweep across the illuminated area. For some purposes these distortions of the output are advantageous since they actually improve sensitivity without destroying the usefulness of the desired information. If the distortion is excessive and is not desired, it can be limited or eliminated by different material choices and by different physical geometries.

The above problem of distortion of the voltage divider gradient, as well as distortion of the voltage gradient from other causes, may be avoided or minimized for precision purposes by applying a series of graded voltage values to spaced points along the upper layer 12 so as to clamp those points and more definitely determine the geometry of the voltage gradient. With such a modified structure, the shape of the voltage gradient may be adjusted at will and the speed of scan may be purposely modified if desired. For instance, the voltage gradient between two of such connections may be reduced to substantially zero so that the scan actually skips the space between such connections. However, if the skipped space is illuminated a large transient vertical trace will occur. This can be ignored because it occurs with such a short portion of the sweep.

While not shown in any of the embodiments illustrated in the drawings, it is possible to connect a control electrode to the intermediate layer 14 of the continuous intermediate layer versions of the invention as illustrated in FIG. 1. Such an electrode may be provided with a gate control voltage which is effective to turn off the scanner if such inhibition is desired. When the device is to be active again the gate voltage is removed from the intermediate layer. The preferred gate voltage polarity is negative for an NPN structure and positive for a PNP structure. If desired, the gating signal applied to the intermediate layer may be an A.C. signal and the output signals are then in the form of a combination of the A.C. and the signal otherwise available from the scanning device. This is effectively a modulated alternating current. It has also been discovered that with certain of the structures 10, in accordance with the present invention, the resolution of the scanner may be improved by simply connecting the intermediate layer 14 through a resistor to ground. It is also possible to provide a modified scanning structure in which the intermediate layer 14 acts as the voltage divider rather than the upper layer 12. However, this arrangement is not believed to be as desirable as the above described embodiments of the invention because it involves a substantial increase in energy losses, and distortion of bleeder voltage distribution.

Another interesting modification of the invention involves the application of an alternating voltage signal in series with the bias voltage source 22. It has been determined that this substantially enhances the output signals available from the scanner. Apparently, as the null D.C. bias voltage condition is achieved at each diode pair, the A.C. impedance of the diode pair is substantially reduced. Accordingly, the switching action within the scanning structure 10 for the alternating voltage is such as to cause a modulation of the A.C. This is a very valuable feature where the system is to be employed as a remote scanner, or where the information obtained from the scanner is to be transmitted over a long distance, because the information may be provided immediately from the scanner as a modulated radio frequency signal which is suitable for immediate transmission through a conventional radio communication or carrier current channel. This mode of operation is not to be confused with that described above in connection with FIG. 2*a* where the A.C. signal is applied to the lower layer 16. However, the alternating current here may be again preferably a radio frequency such as 200-kilocycles.

The term "elongated" is employed in this specification to help define the shape of the scanning structure 10. As used here, this term is intended to emphasize the lateral dimension of the structure parallel to the semi-conductor junctions 18 and 20 and between connections 24 and 26. This is a characteristic which is present not only in the line scanner versions of the invention, such as shown in FIG. 1, but also in the area scanning versions such as shown in FIGS. 5, 6, and 7. Thus, the term "elongated," is intended to refer to the area scanning structure 10C, 10D and 10E, as well as to the line scanning structures such as 10 and 10A. Therefore, this term, as used here, does not necessarily imply that the structure is narrow in both of its other dimensions.

While the invention has been particularly shown and described with reference to preferred embodiments thereof, it will be understood by those skilled in the art that various changes in form and details may be made therein without departing from the spirit and the scope of the invention.

What is claimed is:

1. A radiation scanner comprising:

(a) an elongated multiple layer structure including an intermediate layer of semi-conductive material of a first conductivity type and two outer layers of semi-conductive material of a second conductivity type, the said layers having asymmetrically conductive semi-conductor junctions therebetween, said junctions having oppositely poled asymmetry and at least one of which has conductive properties responsive to radiation incident thereon;

(b) means connecting one of said outer layers at laterally spaced positions thereon to sources of different bias voltage levels to establish a potential gradient in the layer extending parallel to the said junctions;

(c) means for connecting the other outer layer to another source having a different value of bias voltage;

(d) means for applying a time variant potential difference across the said two outer layers in a direction perpendicular to the said junctions;

(e) a means connected in circuit between said outer layers for detecting functions of the current between said outer layers.

2. A radiation scanner for scanning an area comprising:

(a) an elongated multiple layer structure having a substantial width and including an inner layer of semi-conductive material of a first conductivity type and two outer layers of a semi-conductive material of a second conductivity type, the said layers having asymmetrically conductive semi-conductive junctions therebetween, said junctions having oppositely poled asymmetry and at least one of which has conductive properties responsive to radiation incident thereon;

(b) means connecting one of said outer layers at laterally spaced positions thereof to sources of different bias voltage levels thereon to establish a potential gradient in the layer extending parallel to the said junctions;

(c) means connecting the other outer layer to a source of another bias voltage level;

(d) means for applying a sweep voltage difference between said outer layers; and (e) means connected in circuit between said outer layers for detecting functions of the current between said outer layers.

3. The area scanner as set forth in claim 2 in which the means connecting one of said outer layers to sources of different bias voltage are so disposed with respect to said layer as to establish a uniform potential parallel to the width of the body and a gradient parallel to the length thereof to define a substantially rectangular scanning area.

4. The area scanner as set forth in claim 2 in which the means connecting one of said outer layers to sources of different bias voltage are so disposed with respect to said layer as to establish a radial potential gradient with equi-potential regions having a common radius, so as to define a circular scanning pattern of controllable radius.

5. A radiation scanner comprising:

(a) a first layer of semi-conductive material of a first conductivity type;

(b) a plurality of discrete bodies of semi-conductive material of a second conductivity type joined to said layer to form therewith a plurality of discrete radiation responsive asymmetrically conductive semi-conductor junctions;

(c) a second layer of semi-conductive material of a first conductivity type joined to said discrete bodies of semi-conductive material to form therewith a plurality of discrete asymmetrically conductive semi-conductor junctions oppositely poled with respect to the junctions of said bodies with said first layer;

(d) means for establishing a potential gradient in said first layer extending parallel to the direction of the said junctions with said bodies, so as to provide a discretely different bias potential at each of the said junctions with said bodies;

(e) means for providing a uniformly distributed time variant bias in said second layer; and (f) means for detecting the current flow absorbed by said second layer.

6. A radiation intensity scanner comprising:

(a) a plurality of pairs of unidirectional current conducting devices, each pair including a radiant energy responsive device and a second device serially connected in opposite conductivity relationship between first and second terminals;

(b) means establishing the first terminal of each different diode pair at a different bias potential level;

(c) means for varying the potential level with respect to time of all of said second terminals in parallel; and (d) means for detecting the magnitude of the current flow between said first and said second terminals.

7. A radiation scanner as set forth in claim 1 and in which said intermediate layer is laterally discontinuous to thereby form discrete pairs of oppositely poled asymmetrically conductive junctions.

8. A radiation scanner as set forth in claim 7 in which said outer layers consist essentially of germanium, and said discontinuous intermediate layer consists essentially of indium metal.

9. A radiation scanner structure in accordance with claim 1 in which said elongated multiple layer structure consists essentially of P type silicon with the outer surfaces thereof being diffused with an N type impurity to provide N type silicon outer layers and a P type intermediate layer with PN junctions therebetween.

10. A radiation scanner as set forth in claim 1 in which said intermediate layer consists essentially of germanium and said outer layers consist essentially of indium.

11. A radiation scanner as set forth in claim 1 in which said intermediate layer consists essentially of germanium and said outer layers consist essentially of gallium arsenide.

12. A radiation scanner in accordance with claim 1 including a connection to said intermediate layer, an additional source of control voltage arranged for connection through said last-named connection to said intermediate layer for providing an electrical gating control of the scanner.

13. A radiation scanner as set forth in claim 1 and including an alternating current source connected to one of said layers.

14. A radiation scanner as set forth in claim 1 and further comprising a high impedance radio frequency generator arranged for connection to said last-named outer layer electrical connection.

15. A radiation scanner in accordance with claim 1 which is arranged for control from a remote control station and further comprising input connections for receiving a square pulse interrogation signal from a remote control station, means connected between said input connections and said spaced outer layer connections for providing said spaced outer layer bias voltage levels in response to said square wave interrogation signal and having an amplitude proportional to the amplitude of said interrogation signal, said means for applying a sweep voltage difference between said outer layers being connected to said input connections for operation in response to said square wave interrogation pulse to provide a sweep voltage difference having a maximum amplitude proportional to the amplitude of the interrogation pulse.

16. A radiation scanner for scanning an area in different directions comprising an elongated multiple layer structure having a substantial width and including an intermediate layer and two outer layers substantially defining the entire upper and lower surfaces of said structure, said intermediate layer being joined to both outer layers throughout substantially the entire length and width thereof, the materials of said layers being selected to form an elongated asymmetrically conductive semi-conductor junction at each of the boundaries between the respective layers, said junctions having oppositely poled asymmetry, at least one of said semi-conductor junctions having substantially increased conductivity in response to illumination thereon when in the back biased condition, at least one of said outer layers having a plurality of electrical connections each including an electrode in contact with the outer surface of said layer, said electrodes being spaced around the periphery of said outer layer in diagonally opposed pairs, means for applying bias voltage level differences across said oppositely disposed pairs and for changing said bias voltage differences to provide for optical scanning in different diagonal directions across the area being scanned, the other outer layer having at least one electrical connection arranged to be connected to a source of another bias voltage level, means for applying a sweep voltage difference between said outer layers, and means connected in circuit between said outer layers for detecting nonuniform changes in the current between said outer layers.

17. An optical scanner comprising an elongated multiple layer semi-conductor crystal structure including an intermediate layer of one conductivity type and two outer layers formed by diffusion of conductivity type determining impurities therein to define said layers as regions of different conductivity type extending throughout substantially the entire length of said structure, said outer layers forming elongated asymmetrically conductive semi-conductor junctions with said intermediate layer, said junctions having oppositely poled asymmetry, at least one of said semi-conductor junctions having photoconductive properties when back biased, at least one of said outer layers having electrical connections at laterally spaced positions thereon arranged for connection to sources of different bias voltage levels to thereby establish a voltage gradient thereacross, the other outer layer having at least one electrical connection arranged to be connected to a source of another bias voltage level, a source of sweep voltage connected to said last-named connection, and a transient voltage output signal detector connected to said last-named connection and operable for detecting changes in the current between said outer layers occurring at a rate above that corresponding to a pre-determined frequency.

18. An optical scanner comprising a plurality of elongated multiple layer structures arranged in parallel alignment to scan an area, each of said structures including an intermediate layer and two outer layers substantially defining the entire upper and lower surfaces of said structure, said intermediate layer being joined to both outer layers throughout substantially the entire length thereof, the materials of said layers being selected to form an elongated asymmetrically conductive semi-conductor junction at each of the boundaries between the respective layers, said junctions having oppositely poled asymmetry, at least one of said semi-conductor junctions having photoconductive properties when in a back biased condition, one of said outer layers having electrical connections at opposite ends thereof and arranged for connection to sources of different bias voltage levels to thereby establish a voltage gradient within said layer between said connections, a common source of bias voltage potential connected to all of the said bias voltage connections of all of said multiple layer structures, the other outer layer of each of said scanner structures having at least one electrical connection arranged to be connected to a source of another bias voltage level, each of said last-named connections including connections to a common commutating device, a sweep voltage generator connected to supply a sweep voltage to said commutating device and through said commutating device to said last-mentioned connections of said respective structures in succession, a signal transmission line connected to said sweep generator for actuation thereof, a separate signal output circuit connected to each of said last-named electrical connections of said structures, each of said output circuits including a capacitor and a blocking diode and being connected in common with each of the other output circuits, an amplifier connected to receive signals from said common output connection, said amplifier being connected to provide said amplifier output signals to said signal transmission line.

19. An optical scanner comprising an elongated multiple layer semi-conductor structure comprising two outer layers of materials of a first conductivity type defining upper and lower surfaces of said structure and an intermediate layer of material of a second conductivity type which is different from said first conductivity type, said intermediate layer being joined to both outer layers to form an elongated semi-conductor junction at each of the boundaries between the respective layers, said junctions forming laterally elongated oppositely poled diodes, at least one of said outer layers having electrical connections at opposite ends thereof arranged for connection to sources of different bias voltages for operation of said layer as a voltage divider, the other outer layer having at least one electrical connection arranged to be connected to a source of another bias voltage level, at least one of said outer layers being arranged to receive optical illumination to be scanned, means for applying a sweep voltage difference between said outer layers, and means connected in circuit with one of said outer layers for detecting abrupt changes in current therein between said outer layers.

20. An optical scanner comprising an elongated multiple layer high resistivity silicon crystal structure including an intermediate layer of one conductivity type and two outer layers formed by diffusion of conductivity type determining impurities therein to define said layers as regions of different conductivity type extending throughout substantially the entire length of said structure, said outer layers forming elongated rectifying semi-conductor junctions with said intermediate layer, said junctions being oppositely poled, said structure being arranged to receive illumination at one of said outer layers and operable to provide hole-electron paris at the adjacent junction in response thereto, at least one of said outer layers having electrical connections at opposite ends thereof arranged for connection across a source of bias voltage to thereby establish a voltage gradient therein, the other outer layer having at least one electrical connection arranged to be connected to another bias voltage level source, a source of sweep voltage connected to said last-named connection, and a transient voltage output signal detector connected to said last-named connection and operable for detecting changes in the current between said outer layers occurring at a rate above that corresponding to a predetermined frequency.

References Cited by the Examiner

UNITED STATES PATENTS

| | | | |
|---|---|---|---|
| 2,790,088 | 4/1957 | Shive | 250—211 |
| 2,812,446 | 11/1957 | Pearson | 250—211 |
| 2,911,539 | 11/1959 | Tanenbaum | 250—211 |
| 2,959,681 | 11/1960 | Noyce | 250—211 |
| 2,963,390 | 12/1960 | Dickson | 250—211 |
| 2,985,805 | 5/1961 | Nelson | 250—211 |
| 3,020,412 | 2/1962 | Byczkowski | 250—211 |
| 3,064,132 | 11/1962 | Strull | 250—211 |

RALPH G. NILSON, *Primary Examiner.*

E. STRICKLAND, M. ABRAMSON, *Assistant Examiners*